US012129673B2

(12) United States Patent
Gallagher et al.

(10) Patent No.: US 12,129,673 B2
(45) Date of Patent: Oct. 29, 2024

(54) CONCRETE VIBRATOR FOR USE IN A BRIEFCASE CONFIGURATION

(71) Applicant: MILWAUKEE ELECTRIC TOOL CORPORATION, Brookfield, WI (US)

(72) Inventors: Patrick D. Gallagher, Oak Creek, WI (US); Travis J. Dubnicka, Menomonee Falls, WI (US); Mitchell Carlson, Lisbon, WI (US); Paul W. Eiche, Oconomowoc, WI (US); Eric C. Onsager, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/888,659

(22) Filed: Aug. 16, 2022

(65) Prior Publication Data

US 2022/0389726 A1 Dec. 8, 2022

Related U.S. Application Data

(63) Continuation of application No. 16/953,612, filed on Nov. 20, 2020.

(Continued)

(51) Int. Cl.

*E04G 21/06* (2006.01)
*B01F 31/44* (2022.01)
*E04G 21/08* (2006.01)

(52) U.S. Cl.

CPC ............ *E04G 21/063* (2013.01); *B01F 31/44* (2022.01); *E04G 21/08* (2013.01)

(58) Field of Classification Search

CPC ........ E04G 21/063; E04G 21/08; B01F 31/44

(Continued)

(56) References Cited

U.S. PATENT DOCUMENTS 1,911,966 A * 5/1933 Pickop .................... E04G 21/08 366/124
2,054,253 A 9/1936 Horsch
(Continued)

FOREIGN PATENT DOCUMENTS

CH 689598 A5 6/1999
CN 2224880 Y 4/1996
(Continued)

OTHER PUBLICATIONS

Makita "XRV01Z 18V LXT® Lithium-Ion Cordless 4' Concrete Vibrator, Tool Only" <https://www.makitatools.com/products/details/XRV01Z> web page publicly available at least as early as Jul. 23, 2019 (2 pages).

(Continued)

*Primary Examiner* — Charles Cooley
(74) *Attorney, Agent, or Firm* — Michael Best & Friedrich LLP

(57) ABSTRACT

A concrete vibrator includes a housing, a handle, an electric motor, a flexible shaft, a vibrator head, and a battery pack. The handle extends from the housing. The electric motor is coupled to the housing. The flexible shaft has a first end coupled to the motor and an opposite, second end. The vibrator head is coupled to the second end of the shaft. The vibrator head is configured to receive torque from the motor and the shaft to cause the vibrator head to vibrate. The battery pack is coupled to a battery receptacle defined on the housing. The battery pack is configured to provide electric power to the electric motor to drive the motor and the shaft. The concrete vibrator is operable in a briefcase configuration in which the handle is used to carry the concrete vibrator with the housing supported in a horizontal orientation.

20 Claims, 5 Drawing Sheets

Related U.S. Application Data

(60) Provisional application No. 62/937,840, filed on Nov. 20, 2019.

(58) Field of Classification Search
USPC .................................................. 366/120–128
See application file for complete search history.

(56) References Cited

U.S. PATENT DOCUMENTS

| | | | | |
|---|---|---|---|---|
| 2,061,943 A | | 11/1936 | Jorgensen | |
| 2,148,765 A | | 2/1939 | Mall | |
| 2,214,142 A | | 9/1940 | Mall | |
| 2,269,938 A | * | 1/1942 | Jackson | E04G 21/08 425/456 |
| 2,276,613 A | * | 3/1942 | Gordon | E04G 21/08 366/128 |
| 2,293,962 A | | 8/1942 | Baily | |
| 2,430,817 A | * | 11/1947 | Jackson | B01F 33/5011 173/217 |
| 2,492,431 A | * | 12/1949 | Kroeckel | E04G 21/08 366/122 |
| 2,597,505 A | * | 5/1952 | Lindkvist | E04G 21/08 366/121 |
| 2,716,022 A | | 8/1955 | Wilson | |
| 2,737,094 A | | 3/1956 | Jackson | |
| 3,180,625 A | | 4/1965 | Wyzenbeek | |
| 3,188,054 A | * | 6/1965 | Mason, Jr. | B06B 1/16 366/121 |
| 4,096,978 A | * | 6/1978 | Noice | A45F 3/04 D3/217 |
| 4,483,070 A | * | 11/1984 | Junkermann | A01G 3/08 30/296.1 |
| 4,555,238 A | | 11/1985 | Miller et al. | |
| 4,662,551 A | * | 5/1987 | Dudley | A45F 3/08 224/907 |
| D388,302 S | | 12/1997 | Inai | |
| D388,677 S | | 1/1998 | Inai | |
| 5,716,131 A | * | 2/1998 | Breeding | E04G 21/066 224/265 |
| 5,725,304 A | | 3/1998 | Inai | |
| 5,829,874 A | * | 11/1998 | Breeding | B01F 31/42 224/265 |
| 6,047,668 A | * | 4/2000 | Yamamoto | A01D 34/902 123/195 A |
| 6,053,259 A | * | 4/2000 | Kojima | A01D 34/902 173/171 |
| 6,065,859 A | | 5/2000 | Breeding | |
| 6,543,926 B2 | | 4/2003 | Sherez | |
| 6,651,853 B2 | * | 11/2003 | Higgins | A45F 4/02 224/652 |
| 6,705,799 B2 | * | 3/2004 | Piccoli | E04F 21/242 404/97 |
| 6,953,304 B2 | | 1/2005 | Quenzi et al. | |
| 6,960,011 B2 | | 11/2005 | Oswald et al. | |
| 6,976,805 B2 | | 12/2005 | Quenzi et al. | |
| 7,097,384 B2 | | 8/2006 | Lindley | |
| 7,121,762 B2 | | 10/2006 | Quenzi et al. | |
| D531,476 S | | 11/2006 | Kokawa et al. | |
| 7,153,058 B2 | * | 12/2006 | Lindley | E04F 21/242 404/115 |
| 7,278,777 B2 | | 10/2007 | Elsten | |
| 7,320,558 B2 | | 1/2008 | Quenzi et al. | |
| 7,491,011 B2 | | 2/2009 | Quenzi et al. | |
| 7,651,296 B2 | | 1/2010 | Lindley | |
| D622,215 S | | 8/2010 | Heimbruch et al. | |
| 7,909,533 B2 | | 3/2011 | Quenzi et al. | |
| 8,439,600 B2 | | 5/2013 | Brening | |
| 8,459,899 B2 | | 6/2013 | Artigas | |
| 9,139,966 B1 | | 9/2015 | Mikowychok | |
| 9,397,531 B2 | | 7/2016 | Mikowychok | |
| 9,695,605 B2 | | 7/2017 | Jin | |
| 9,719,215 B2 | | 8/2017 | Mikowychok | |
| D803,155 S | * | 11/2017 | Meyer | D13/112 |
| 10,184,217 B2 | | 1/2019 | Mikowychok | |
| D849,795 S | | 5/2019 | Taniguchi et al. | |
| 10,326,331 B2 | | 6/2019 | Mikowychok | |
| 11,658,546 B2 | | 5/2023 | Sprague et al. | |
| D1,000,927 S | | 10/2023 | Schlosser et al. | |
| 2003/0111753 A1 | | 6/2003 | Oswald et al. | |
| 2004/0144188 A1 | * | 7/2004 | Steffen | E04G 21/08 74/86 |
| 2005/0069385 A1 | * | 3/2005 | Quenzi | E01C 19/44 404/114 |
| 2005/0158121 A1 | * | 7/2005 | Lindley | E01C 19/402 404/114 |
| 2006/0032883 A1 | * | 2/2006 | Moreno | A45F 3/04 224/652 |
| 2007/0201302 A1 | | 8/2007 | Lindley | |
| 2007/0259720 A1 | * | 11/2007 | Oswald | F02D 11/02 477/187 |
| 2008/0253221 A1 | * | 10/2008 | Lindley | E04G 21/066 366/128 |
| 2010/0218386 A1 | * | 9/2010 | Ro | B27B 17/08 30/277.4 |
| 2011/0164923 A1 | | 7/2011 | Quenzi et al. | |
| 2012/0092948 A1 | * | 4/2012 | Heimbruch | E04G 21/08 318/245 |
| 2015/0022040 A1 | | 1/2015 | Mikowychok | |
| 2019/0006980 A1 | * | 1/2019 | Sheeks | H01M 10/4207 |
| 2019/0207465 A1 | | 7/2019 | Jaworski et al. | |
| 2020/0037735 A1 | | 2/2020 | Steffen et al. | |
| 2021/0148126 A1 | * | 5/2021 | Gallagher | E04G 21/063 |
| 2022/0021065 A1 | | 1/2022 | Yueda | |
| 2022/0290451 A1 | | 9/2022 | Yueda | |
| 2022/0341198 A1 | * | 10/2022 | Gallagher | E04G 21/066 |
| 2022/0389726 A1 | * | 12/2022 | Gallagher | B25F 5/00 |
| 2024/0039371 A1 | * | 2/2024 | Minkebige | E04G 21/08 |
| 2024/0044158 A1 | * | 2/2024 | Ineyama | E04G 21/08 |

FOREIGN PATENT DOCUMENTS

| | | |
|---|---|---|
| CN | 2673999 Y | 1/2005 |
| CN | 101070730 A | 11/2007 |
| CN | 201087558 Y | 7/2008 |
| CN | 201152026 Y | 11/2008 |
| CN | 201539102 U | 8/2010 |
| CN | 201874245 U | 6/2011 |
| CN | 202559760 U | 11/2012 |
| CN | 202671988 U | 1/2013 |
| CN | 203113804 U | 8/2013 |
| CN | 203334687 U | 12/2013 |
| CN | 203769331 U | 8/2014 |
| CN | 204001769 U | 12/2014 |
| CN | 204024073 U | 12/2014 |
| CN | 204435889 U | 7/2015 |
| CN | 204609314 U | 9/2015 |
| CN | 204715768 U | 10/2015 |
| CN | 204876584 U | 12/2015 |
| CN | 204899229 U | 12/2015 |
| CN | 104179821 B | 5/2016 |
| CN | 205243026 U | 5/2016 |
| CN | 103696427 B | 6/2016 |
| CN | 205348801 U | 6/2016 |
| CN | 205577434 U | 9/2016 |
| CN | 205604733 U | 9/2016 |
| CN | 205663222 U | 10/2016 |
| CN | 106121245 A | 11/2016 |
| CN | 205713139 U | 11/2016 |
| CN | 205713140 U | 11/2016 |
| CN | 104167865 B | 1/2017 |
| CN | 104947939 B | 5/2017 |
| CN | 206144165 U | 5/2017 |
| CN | 206158197 U | 5/2017 |
| CN | 206189863 U | 5/2017 |
| CN | 106836819 A | 6/2017 |
| CN | 106907009 A | 6/2017 |
| CN | 206245751 U | 6/2017 |
| CN | 206319616 U | 7/2017 |
| CN | 206386130 U | 8/2017 |
| CN | 206458100 U | 9/2017 |
| CN | 206591833 U | 10/2017 |

(56) References Cited

FOREIGN PATENT DOCUMENTS

| | | | | |
|---|---|---|---|---|
| CN | 107326778 | A | | 11/2017 |
| CN | 206693635 | U | | 12/2017 |
| CN | 206769409 | U | | 12/2017 |
| CN | 206859692 | U | | 1/2018 |
| CN | 207048335 | U | | 2/2018 |
| CN | 207092558 | U | | 3/2018 |
| CN | 207131094 | U | | 3/2018 |
| CN | 207392761 | U | | 5/2018 |
| CN | 207469046 | U | | 6/2018 |
| CN | 207829481 | U | | 9/2018 |
| CN | 108691418 | A | | 10/2018 |
| CN | 108868149 | A | | 11/2018 |
| CN | 208088844 | U | | 11/2018 |
| CN | 208088846 | U | * | 11/2018 |
| CN | 208122326 | U | | 11/2018 |
| CN | 208122327 | U | | 11/2018 |
| CN | 208158481 | U | | 11/2018 |
| CN | 208294094 | U | | 12/2018 |
| CN | 105926948 | B | | 2/2019 |
| CN | 208456144 | U | | 2/2019 |
| CN | 109457975 | A | | 3/2019 |
| CN | 208633552 | U | | 3/2019 |
| CN | 208668974 | U | | 3/2019 |
| CN | 209099777 | U | | 7/2019 |
| CN | 305483382 | | | 12/2019 |
| DE | 1876488 | U | | 7/1963 |
| DE | 2724247 | A1 | | 12/1978 |
| DE | 8119755 | U1 | | 11/1981 |
| DE | 29619153 | U1 | | 1/1997 |
| DE | 20017054 | U1 | | 1/2001 |
| DE | 10106136 | A1 | | 8/2002 |
| DE | 202004004041 | U1 | | 7/2004 |
| DE | 102022105065 | A1 | * | 9/2022 | .............. B01F 31/44 |
| EP | 0964116 | A1 | | 12/1999 |
| EP | 1182307 | A1 | * | 2/2002 | ................ B25F 3/00 |
| EP | 1316655 | A1 | | 6/2003 |
| EP | 2112298 | A1 | | 10/2009 |
| EP | 3462518 | A2 | | 4/2019 |
| EP | 4306744 | A2 | * | 1/2024 | ................ B25F 5/02 |
| JP | 2018100567 | A | * | 6/2018 |
| JP | 2019019530 | A | | 2/2019 |
| JP | 6530852 | B1 | | 6/2019 |
| KR | 2019940005766 | U | | 3/1994 |
| KR | 200376283 | Y1 | | 3/2005 |
| KR | 20190105415 | A | | 9/2019 |
| WO | WO9746775 | A1 | | 12/1997 |
| WO | WO-2010087960 | A1 | * | 8/2010 | ............. E04G 21/08 |
| WO | 2014006907 | A1 | | 1/2014 |
| WO | WO2018068091 | A1 | | 4/2018 |
| WO | WO2018088440 | A1 | | 5/2018 |
| WO | 2021090605 | A1 | | 5/2021 |

OTHER PUBLICATIONS

International Search Report and Written Opinion for Application No. PCT/US2020/061442 dated Mar. 16, 2021 (11 pages).

Extended European Search Report for Application No. 20890679.2 dated Apr. 3, 2024 (14 pages).

Partial Supplementary European Search Report for Application No. 20890679.2 dated Nov. 21, 2023 (12 pages).

Partial European Search Report for Application No. 23183006.8 dated Nov. 21, 2023 (13 pages).

Milwaukee Tool, "Milwaukee® MX Fuel™ Concrete Vibrator," video available at <https://www.youtube.com/watch?v=NE9OuUChZ0M> YouTube publication date Jun. 2, 2022 (1 page).

* cited by examiner

CONCRETE VIBRATOR FOR USE IN A BRIEFCASE CONFIGURATION

CROSS-REFERENCE TO RELATED APPLICATIONS

This application is a continuation of co-pending U.S. patent application Ser. No. 16/953,612 filed on Nov. 20, 2020, which claims priority to U.S. Provisional Patent Application No. 62/937,840 filed on Nov. 20, 2019, the entire contents of both of which are incorporated herein by reference.

FIELD OF THE INVENTION

The present invention relates to power tools, and more particularly to concrete vibrators.

BACKGROUND OF THE INVENTION

Concrete vibrators are typically used to spread poured concrete around a framework, such as rebar, in a construction operation. Such concrete vibrators are typically powered by an internal combustion engine, which can be difficult to carry by an operator using the concrete vibrator while on a worksite.

SUMMARY OF THE INVENTION

The invention provides, in one aspect, a concrete vibrator including a housing, a handle, an electric motor, a flexible shaft, a vibrator head, and a battery pack. The handle extends from the housing. The electric motor is coupled to the housing. The flexible shaft has a first end coupled to the motor and an opposite, second end. The vibrator head is coupled to the second end of the shaft. The vibrator head is configured to receive torque from the motor and the shaft to cause the vibrator head to vibrate. The battery pack is coupled to a battery receptacle defined on the housing. The battery pack is configured to provide electric power to the electric motor to drive the motor and the shaft. The concrete vibrator is operable in a briefcase configuration in which the handle is used to carry the concrete vibrator with the housing supported in a horizontal orientation.

The invention provides, in another independent aspect, a concrete vibrator including a housing, a handle, an electric motor, a flexible shaft, a vibrator head, a battery pack, and a remote control unit. The handle extends from the housing. The electric motor is coupled to the housing. The flexible shaft has a first end coupled to the motor and an opposite, second end. The vibrator head is coupled to the second end of the shaft. The vibrator head is configured to receive torque from the motor and the shaft to cause the vibrator head to vibrate. The battery pack is coupled to a battery receptacle defined on the housing. The battery pack is configured to provide electric power to the electric motor to drive the motor and the shaft. The remote control unit is capable of adjusting the operation of the motor to adjust a vibration frequency of the vibrator head while the concrete vibrator is operated in a briefcase configuration in which the handle is used to carry the concrete vibrator with the housing supported in a horizontal orientation.

The invention provides, in another independent aspect, a concrete vibrator including a housing, a handle, an electric motor, a flexible shaft, a vibrator head, and a battery pack. The handle extends from the housing. The electric motor is coupled to the housing. The flexible shaft has a first end coupled to the motor and an opposite, second end. The vibrator head is coupled to the second end of the shaft. The vibrator head is configured to receive torque from the motor and the shaft to cause the vibrator head to vibrate. The battery pack is coupled to the battery receptacle defined on the housing. The battery pack is configured to provide electric power to the electric motor to drive the motor and the shaft. The concrete vibrator is operable in a briefcase configuration in which at least one of the base portion and the handle portion is used to carry the concrete vibrator in a horizontal orientation. The electric motor has a power output of at least 2760 W and a nominal outer diameter of up to about 80 mm. The battery pack has a nominal voltage of about 80 V.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
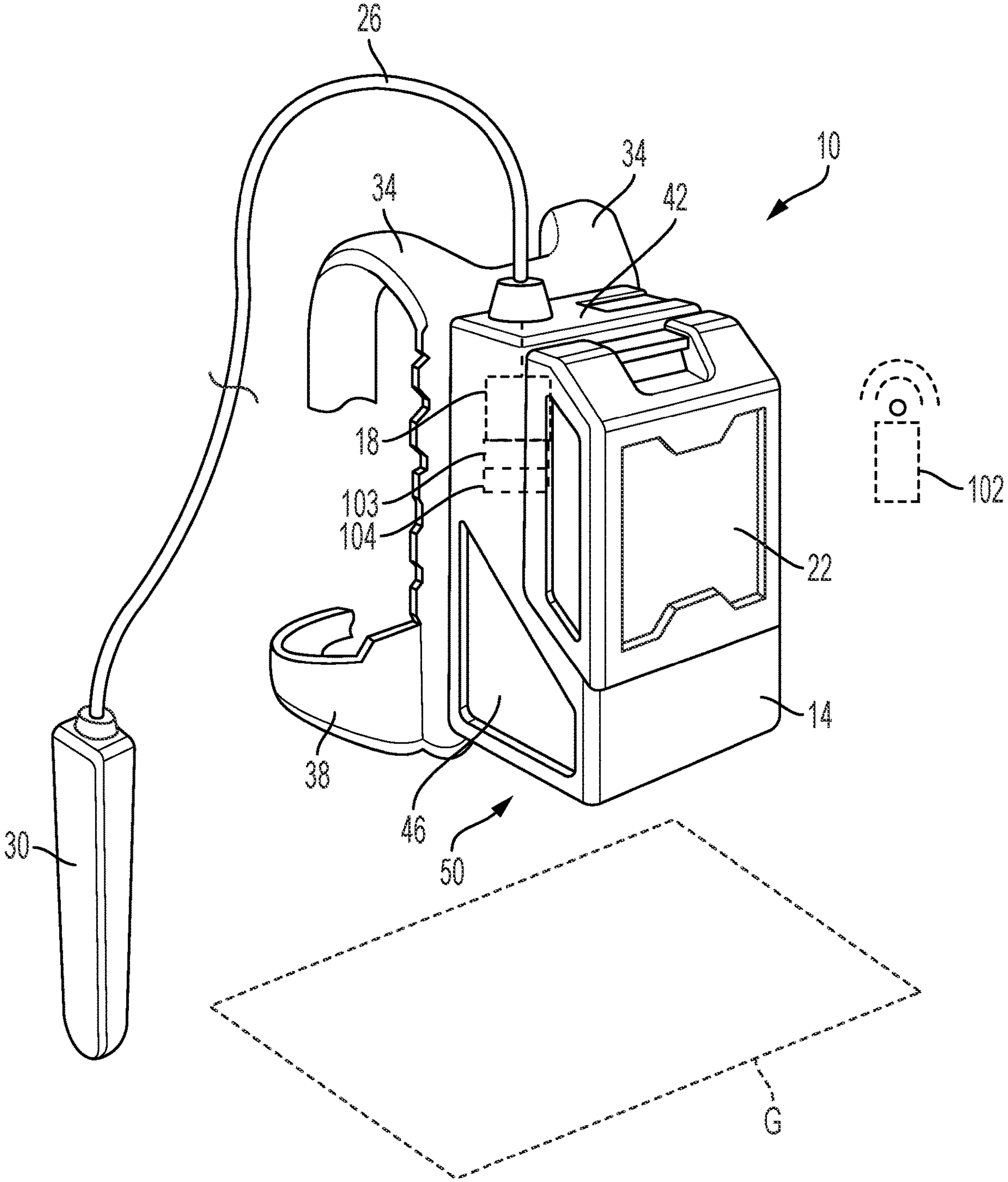
FIG. 1 is a perspective view of a concrete vibrator in accordance with an embodiment of the invention in a backpack configuration.
Figure 2:
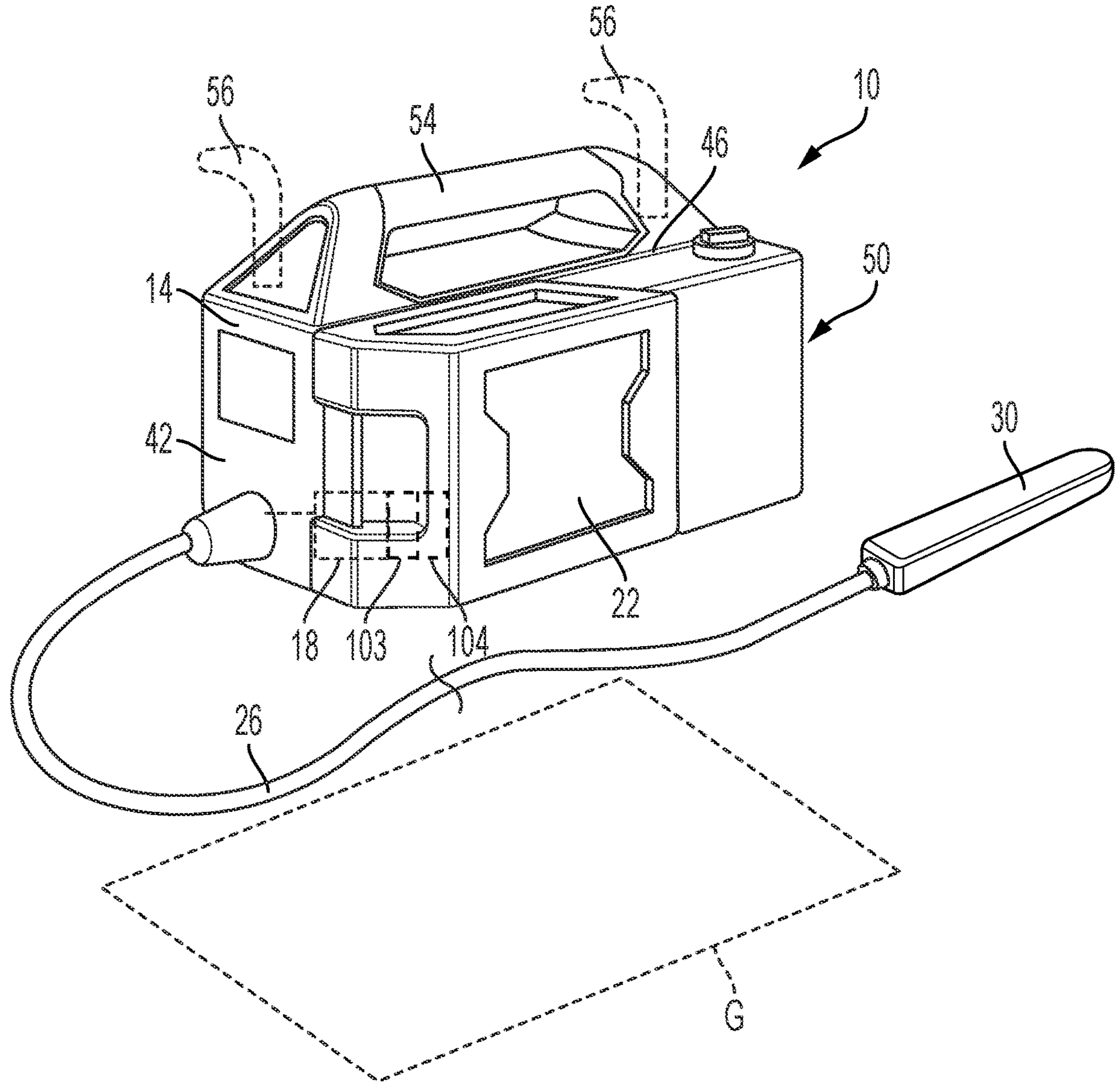
FIG. 2 is a perspective view of the concrete vibrator of FIG. 1 in a briefcase configuration.

FIGS. 1 and 2 illustrate a concrete vibrator 10 including a housing 14, a power unit (e.g., a brushless direct current electric motor 18) positioned within the housing 14, and a battery pack 22 carried onboard the housing 14 for providing power to the electric motor 18. In some embodiments, the battery pack 22 and the motor 18 can be configured as an 80 Volt high power battery pack and motor, such as the 80 Volt battery pack and motor disclosed in U.S. patent application Ser. No. 16/025,491 filed on Jul. 2, 2018 (now U.S. Patent Application Publication No. 2019/0006980), the entirety of which is incorporated herein by reference. In such a battery pack 22, the battery cells within the battery pack 22 have a nominal voltage of up to about 80 V. In some embodiments, the battery cells are operable to output a sustained operating discharge current of between about 40 A and about 60 A. In some embodiments, each of the battery cells has a capacity of between about 3.0 Ah and about 5.0 Ah. And, in some embodiments of the motor 18 when used with the 80 Volt battery pack 38, the motor 18 has a power output of at least about 2760 W and a nominal outer diameter (measured at the stator) of up to about 80 mm.

The concrete vibrator 10 also includes a flexible shaft 26 extending from the housing 14 and a vibrator head 30 connected to an end of the shaft 26. As explained in further detail below, the shaft 26 receives torque from the motor 18. The torque is transmitted to the vibrating head 30, causing it to vibrate. With reference to FIG. 1, the concrete vibrator 10 also includes a pair of straps 34 that permit the concrete vibrator 10 to be carried in a "backpack configuration" in which the housing 14 is vertically oriented (i.e., with the length dimension of the housing 14 extending parallel with the height dimension of the user). The concrete vibrator 10 may optionally include a hip band 38 in addition to the straps 34 to further secure the concrete vibrator 10 to the user.

When the concrete vibrator 10 is carried by a user in the backpack configuration shown in FIG. 1, the flexible shaft 26 extends from a top surface 42 of the housing 14. In this manner, the flexible shaft 26 extends from the housing 14 in a direction away from the ground G when the concrete vibrator 10 is being carried in the backpack configuration. In this configuration, the straps 34 wrap around the user's shoulders and the hip band 38 wraps around the user's hips or waist. In the backpack configuration, a user can easily maneuver the flexible shaft 26 and vibrating head 30 with a single hand while supporting the vibrator 10 with their body and through the straps 34. In addition, because the flexible shaft 26 extends from the top surface 42 of the housing 14 in the backpack configuration of the vibrator 10, the user may carry the vibrating head 30 with either their right hand or left hand without requiring the shaft 26 to cross sideways in front or in back of the user, as it would if the shaft 26 were to extend from one of the side-facing surfaces 46 of the housing 14 when the vibrator 10 is carried in the backpack configuration.

In the illustrated embodiment of the concrete vibrator 10, the shaft 26 extends upward from the top surface 42 of the housing 14, is bent into a "U" shape, and redirected downward for the vibrating head 30 to be grasped by the user. In other embodiments, the flexible shaft 26 may protrude from a downward-inclined surface (embodiment of FIGS. 7-9) of the housing 14 adjacent the top surface 42, such that the shaft 26 may extend from the housing 14 and downward towards the ground G, without requiring the shaft 26 to be initially bent into a "U" shape, when the user carries the vibrator 10 in the backpack configuration.

In yet another embodiment, the flexible shaft 26 may extend from a bottom surface 50 of the housing 14 when the vibrator 10 is carried in the backpack configuration. In this embodiment, the flexible shaft 26 protrudes from the bottom surface 50 of the housing 14 in a direction towards the ground when a user supports the vibrator with the straps 34. Notably, in this embodiment, as well as the embodiment shown in FIG. 1, the vibrating head 30 may be held with either the user's left or right hand without the flexible shaft 26 crossing sideways in front or in back of the user. If the shaft 26 were to extend from one of the side-facing surfaces of the housing 14 when the vibrator 10 is carried in the backpack configuration, the shaft 26 would cross sideways in front or in back of the user.

With reference to FIG. 2, in addition to the straps, the concrete vibrator 10 includes a handle 54 extending from one of the side-facing surfaces 46 of the housing 14 extending between the top and bottom surfaces 42, 50 of the housing 14. The handle 54 permits the concrete vibrator 10 to be alternatively carried in a "briefcase configuration" in which the housing 14 is horizontally oriented (i.e., with the length dimension of the housing 14 extending perpendicular to the height dimension of the user). In the briefcase configuration, the flexible shaft 26 protrudes from the housing 14 in a direction that is substantially parallel with the ground G, allowing the user to easily maneuver the flexible shaft 26 and the vibrating head 30 with one hand, while supporting the vibrator 10 with the other hand. If desired by the operator, the straps 34 and/or hip band 38 may be detached from the housing 14. The operator may decide to remove the straps 34, for example, to reduce the weight of the vibrator 10. When it is desired to again carry the vibrator 10 in the backpack configuration, the straps 34 and hip band 38 may be reattached to the housing 14. Alternatively, the concrete vibrator 10 may include more than one handle 54 on different portions of the housing 14, respectively, to permit carrying the vibrator 10 in multiple different configurations or orientations.

Optionally, the concrete vibrator 10 may include one or more hooks 56 extending from one of the side-facing surfaces 46 of the housing 14. FIG. 2 illustrates two hooks 56 extending from one of the side-facing surfaces 46 extending between top and bottom surfaces 42, 50 of the housing 14. The hooks 56 are dimensioned to engage and disengage a corresponding railing (not shown) found on a worksite as a part of a wall form, or found within a vehicle for transporting the concrete vibrator 10 between worksites. The hooks 56 support the weight of the concrete vibrator 10 on the railing. The hooks 56 may be selectively removable from the concrete vibrator 10 if not needed.

Figure 3:
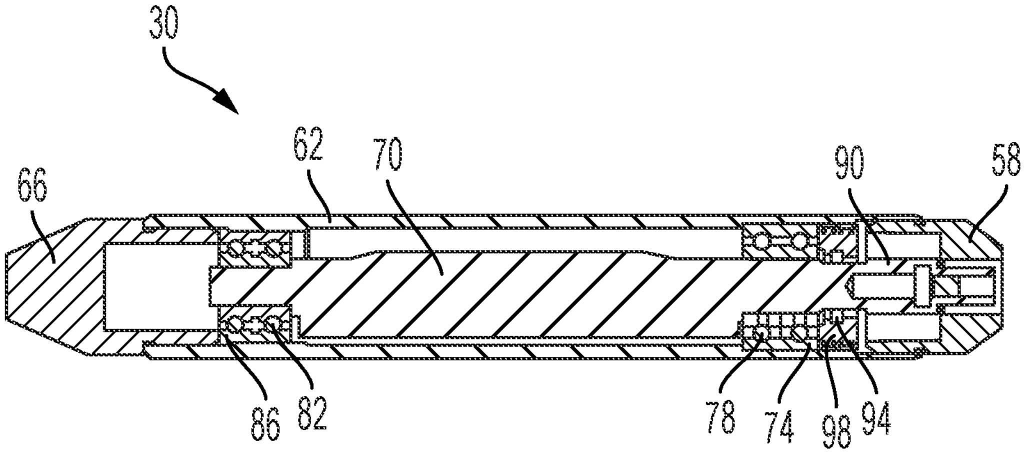
FIG. 3 is a section view of a vibrator head of the concrete vibrator taken along section line 3-3 in FIG. 1.
Figure 4:
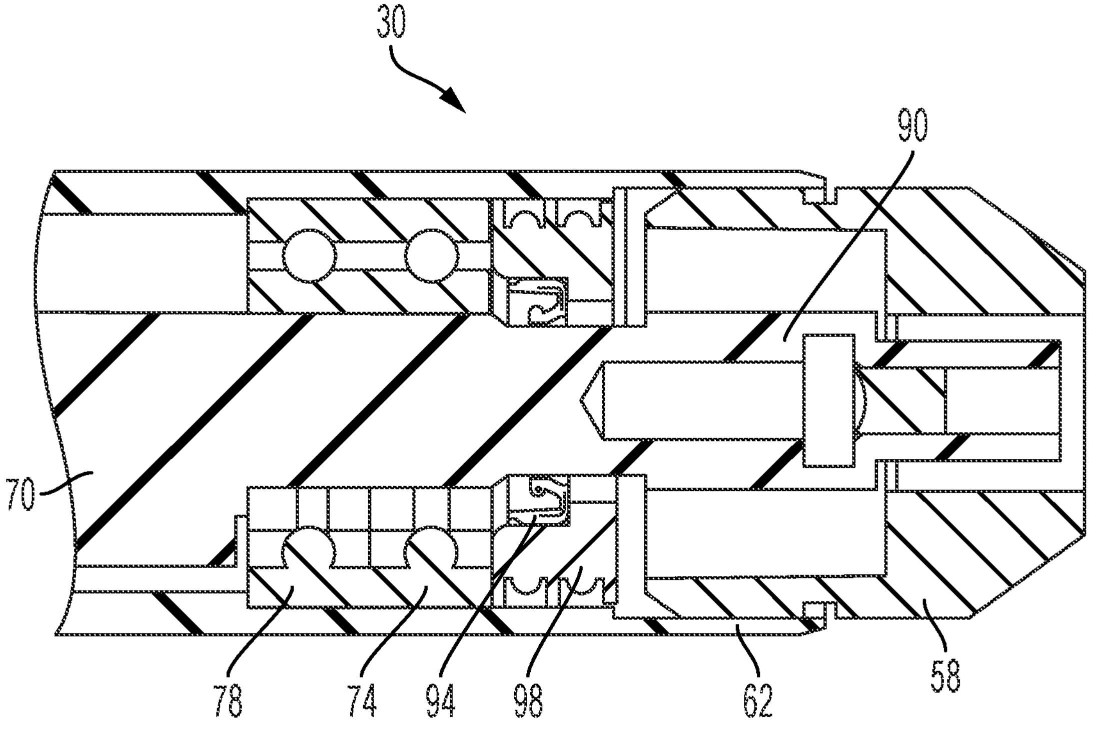
FIG. 4 is an enlarged view the vibrator head taken along section line 4-4 of FIG. 3.

FIGS. 3-4 illustrate the vibrator head 30 in detail. Specifically, the vibrator head 30 includes an outer housing having a connection portion 58 on one side of a body portion 62, and a tip portion 66 on the opposite side of the body portion 62. The tip portion 66 and the connection portion 58 are press-fit or otherwise mechanically connected to the body portion 62. The vibrator head 30 also includes an eccentric shaft 70 rotatably supported at opposite ends by respective pairs of radial bearings 74, 78, 82, 86 positioned within the body portion 62. The eccentric shaft 70 receives torque from the flexible shaft 26, causing the eccentric shaft 70 to rotate. The eccentric shaft 70 is configured to vibrate the vibrator head 30 upon receiving torque from the flexible shaft 26.

As shown in FIG. 4, the vibrator head 30 includes a coupling 90 interconnecting the eccentric shaft 70 and the flexible shaft 26. The vibrator head 30 further includes a lip seal 94 located between the coupling 90 and the bearings 74, 78 to inhibit infiltration of wet concrete or other fluids into the body portion 62. A seal retainer 98 is radially disposed between the lip seal 94 and the body portion 62 to retain the radial and longitudinal position of the lip seal 94 relative to the eccentric shaft 70.

With reference to FIG. 1, in some embodiments, the concrete vibrator 10 includes a remote control unit 102 in communication with a controller 103. The controller 103 may transmit and receive signals to from the remote control unit 102 to control operation of the motor 18. The controller 103 is in electrical communication with the motor 18. The remote control unit 102 is operable to communicate with the controller 103 via a communications link to adjust the vibration frequency of the vibrator head 30. The remote control unit 102 is operable to receive a signal from the controller 103 indicating a running state of the motor 18.

Figure 5:
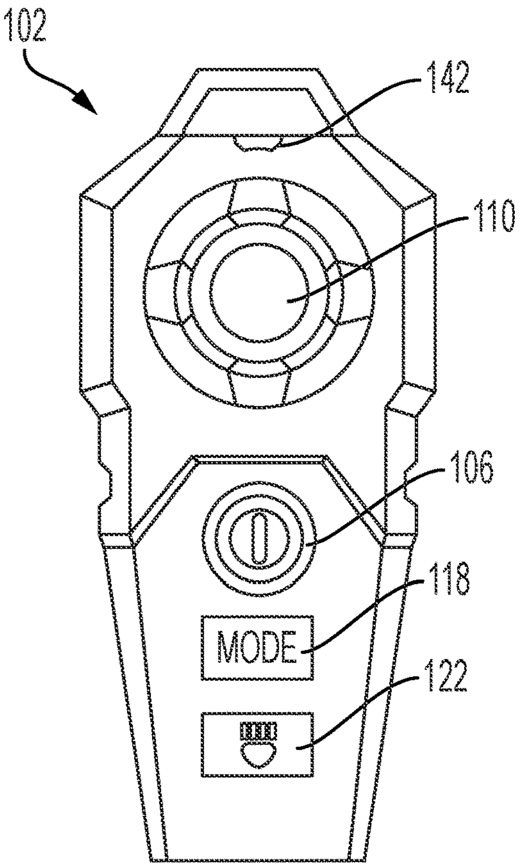
FIG. 5 is a plan view of a remote control unit for use with the concrete vibrator of FIG. 1.

The remote control unit 102 is more clearly shown in FIG. 5. The remote control unit 102 is capable of wirelessly transmitting a signal to the controller 103 in response to a user depressing a power button 106 on the remote control unit 102. The signal is wirelessly transmitted to the motor control unit of the concrete vibrator 10 to activate and deactivate the motor 18. In some embodiments, the concrete vibrator 10 may include feedback control capable of detecting physical properties of wet concrete in which the vibrator head 30 is submerged and then adjusting the speed of the motor 18 to optimize the frequency of vibration of the concrete vibrator 10. Such feedback control may be continuously active as long as the motor 18 remains activated, allowing the frequency of vibration of the vibrator 30 to be adjusted contemporaneously with movement of the vibrator 30 throughout the wet concrete.

Additionally or alternatively, the remote control unit 102 is capable of controlling the speed of the motor 18 with a joystick 110 on the remote control unit 102. Input from the joystick 110 may be transmitted wirelessly to the motor control unit of the concrete vibrator 10 to adjust the speed of the motor 18. In some embodiments, the joystick 110 may be toggled in a first direction (e.g., toward the right from the frame of reference of FIG. 5) to increase the speed of the motor 18, and toggling the joystick 110 in an opposite, second direction (e.g., toward the left from the frame of reference of FIG. 5) may decrease the speed of the motor 18. Similarly, the joystick 110 may be toggled in a vertical direction (i.e., up or down from the frame of reference of FIG. 5) to adjust the motor 18 between a forward rotational direction and a reverse rotational direction, respectively. Also, in some embodiments, depressing or clicking the joystick 110 (i.e., into the page from the frame of reference of FIG. 5) may adjust the motor 18 between a fast-operating mode and a slow-operating mode, with the speed setting in each mode being preselected from the manufacturer or being user-configurable. Additionally or alternatively, the remote control unit 102 may utilize a dial potentiometer (not shown) to set or adjust the speed of the motor 18. In the illustrated embodiment, the forward/reverse control and speed control of the motor 18 is integrated using the single joystick 110. However, in alternate embodiments, the forward/reverse control and speed control of the motor 18 may be performed by separate switches or buttons. The remote control unit 102 is configured to receive user input and transmit the user input to the controller 103. The controller 103 is configured to receive the user input and adjust the operation of the motor based on the user input.

The concrete vibrator 10 may be provided with one or more work lights 104 (shown schematically in FIG. 6) to illuminate an area of wet concrete in which the vibrator 30 is immersed. The lights 104 may be capable of changing between a spot illumination mode, in which the light generated by the concrete vibrator 10 is cast about a relatively small area, and a flood illumination mode, in which the light generated by the concrete vibrator 10 is cast about a relatively large area. The work lights 104 may also be deactivated if not needed. In the illustrated embodiment, the remote control unit 102 includes a light mode selection button 118 that allows a user to switch between the spot illumination mode, the flood illumination mode, and an "off" mode in which the lights are deactivated. The remote control unit 102 also includes a brightness control button 122 that allows a user to adjust the brightness of the work lights 104 between multiple different levels. For example, the brightness control button 122 may be depressed by a user to sequentially adjust the work lights between two or more brightness levels.

The remote control unit 102 includes an onboard rechargeable power source (i.e., a battery, not shown). As such, the remote control unit 102 may be charged by connection with a receptacle onboard the concrete vibrator 10 or another tool with which the battery pack 22 is interchangeable. Alternatively, the remote control unit 102 may be charged via a USB cable, through an inductive charger, or through another charging means with the battery remaining onboard the remote control unit 102. As a further alternative, the remote control unit 102 may contain a removable battery capable of being charged with a separate charger.

Figure 6:
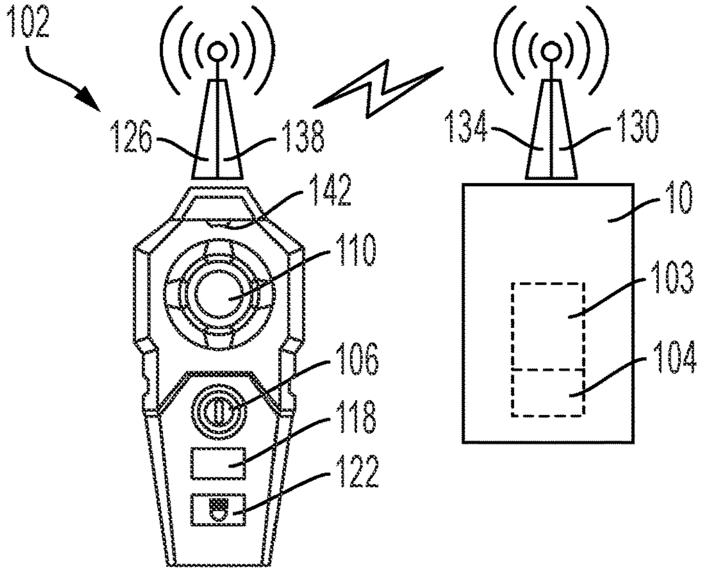
FIG. 6 is a schematic view of the remote control unit of FIG. 5 communicating with the concrete vibrator of FIG. 1.

The remote control unit 102 may utilize one of many methods to communicate with the concrete vibrator 10. For example, at least BTLE, standard Bluetooth, radio frequency communication such as 433 MHz, Wi-Fi, infrared, or standard cellular communication frequencies (2G, 3G, 4G, 5G, or LTE services) provide adequate communication methods between the remote control unit 102 and the concrete vibrator 10. The remote control unit 102 may include a transmitter 126 configured to send messages to a receiver 130 on the concrete vibrator 10 (FIG. 6). A communications link between the transmitter 126 of the remote control unit 102 and the receiver 130 of the concrete vibrator 10 may be established via a UART (Universal Asynchronous Receiver-Transmitter), SPI (Serial Peripheral Interface), or a RS485 communications link. Other such communications links may be used. One such other communications link may be a hardware link where a signal generated by one of the concrete vibrator 10 or remote control unit 102 activates a physical switch on the other of the concrete vibrator 10 and the remote control unit 102. The remote control unit 102 is paired with the concrete vibrator 10 through known methods and using the communications method and communications link. The communications link between the remote control unit 102 and the concrete vibrator 10 is shown schematically in FIG. 6. In other embodiments, the remote control unit 102 may be a wired communication device receiving power and communicating through a wired connection with the concrete vibrator 10.

Additionally or alternatively, a signal may be generated by the controller 103 of the concrete vibrator 10 to indicate the running state (i.e., on/off status, direction, and speed) of the motor 18. This signal may be sent by a transmitter 134 of the concrete vibrator 10 and may be received by a receiver 138 of the remote control unit 102 for communicating the signal to the user via an indicator 142 on the remote control unit 102. Thus, the indicator 142 may communicate to a user of the concrete vibrator 10 the running state of the motor 18. In the illustrated embodiment, the indicator 142 is an LED configured to illuminate, for example, when the motor 18 is activated. Alternatively or additionally, the indicator 142 may provide an audible or tactile signal to the user.

When using the remote control unit 102, a first user carrying the concrete vibrator 10 may be responsible for submerging and moving the head 30 throughout a region of wet concrete, while a second user may hold the remote control unit 102 and be responsible for adjusting the frequency of vibration of the head 30 to account for variations in the consistency of the wet concrete, or to adjust the vibrator head 30 for use with wet concrete in different stages of dryness. In this manner, the user carrying the vibrator 10 needs only to concentrate on placement of the head 30 within the wet concrete. Alternatively, the same user responsible for submerging and moving the head 30 may also hold the remote control unit 102 and be responsible for adjusting the frequency of vibration of the head 30. This allows a single user to adjust the frequency of vibration of the head 30 based on tactile feedback from the vibrating head due to the consistency of the wet concrete. Additionally or alternatively, a single user can operate the concrete vibrator 10 by submerging the head 30 in wet concrete and controlling the frequency of vibration of the head 30 using the remote control unit 102, all while carrying the concrete vibrator 10 with the straps 34.

In operation, the vibrator head 30 can be submerged in wet concrete and the remote control unit 102 can allow a user or users of the concrete vibrator 10 to adjust the frequency of vibration of the vibrator head 30 without requiring a user to carry the concrete vibrator 10. Optionally, during operation, a user can hold the concrete vibrator 10 with the straps 34, 38 in a backpack configuration (see e.g., FIG. 1), with the handle 54 in a briefcase configuration (see e.g., FIG. 2), or the user can rest a side-facing surface 46 or bottom surface 50 of the concrete vibrator 10 on the ground G. These options for operating the concrete vibrator 10 provide first, second, and third operating possibilities, respectively, wherein each operating possibility provides a single user the ability to adjust the operation of the concrete vibrator 10 while the user simultaneously controls the location of the vibrator head 30 within wet concrete. At least the third operating possibility is made possible by the remote control unit 102.

Figure 7:
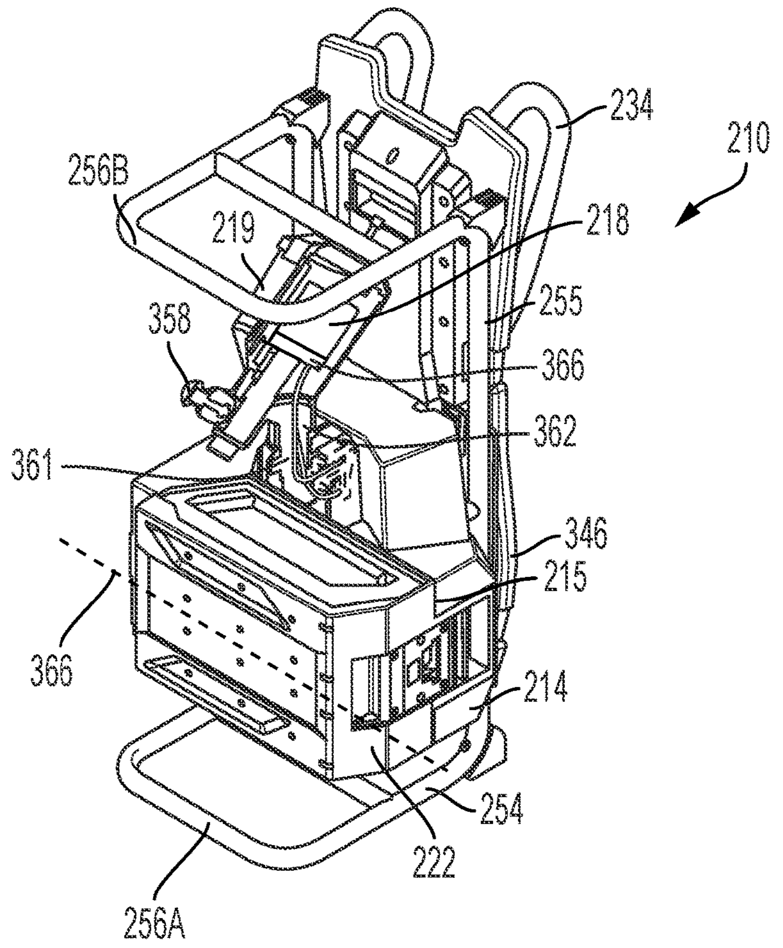
FIG. 7 is a perspective view of a concrete vibrator in accordance with another embodiment of the invention in a backpack configuration with a portion of the motor housing hidden.
Figure 8:
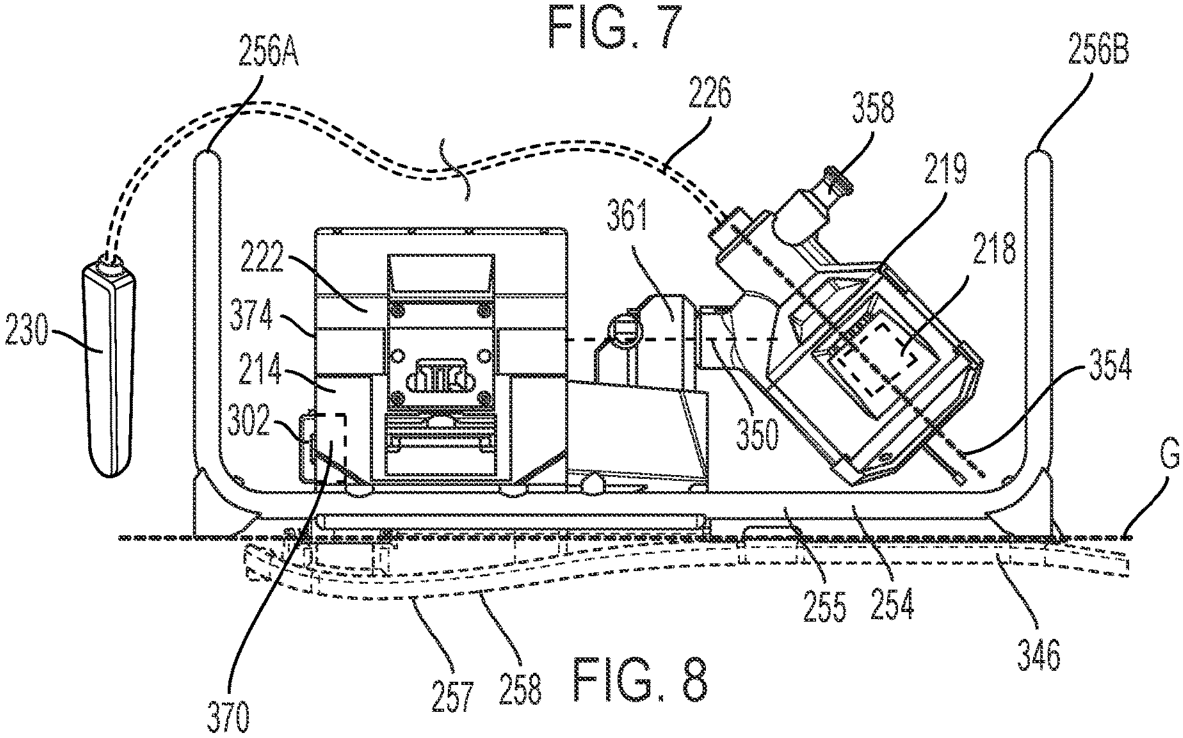
FIG. 8 is a plan view of the concrete vibrator of FIG. 7 in a briefcase configuration.

FIGS. 7 and 8 illustrate another embodiment of a concrete vibrator 210, with like features as the concrete vibrator 10 being labeled with reference numerals plus "200." In the concrete vibrator 210, the housing 214 receives the battery pack 222, and is mounted on a frame 254. The frame 254 is a tubular structure on which the housing 214 is mounted and functions as a handle to facilitate carrying the vibrator 210 in a briefcase configuration. With reference to FIG. 7, the vibrator 210 also includes a back plate 346 attached to the frame 254 that is ergonomically contoured to rest upon a user's back when the vibrator 210 is carried in a backpack configuration. Dual straps 234 are tethered to the back plate 346 and may be slung over a user's shoulders to hold the vibrator 210 in a generally vertical orientation when the vibrator 210 is carried with the straps 234 in the backpack configuration.

With reference to FIGS. 8 and 9, the motor 218 of the concrete vibrator 210 is positioned within a motor housing 219. The motor housing 219 is pivotably coupled to the main housing 214 to orient and/or reorient the shaft 226 relative to the frame 254 and the main housing 214. The motor housing 219 is pivotable relative to the main housing 214 about a connection axis 350 (FIG. 8), which is obliquely oriented relative to a motor axis 354 defined by the motor 218. For example, an angle between the connection axis 350 and the motor axis 354 is in the range of 20 degrees to 60 degrees. In the illustrated embodiment of the vibrator, an angle between the connection axis 350 and motor axis 354 is 45 degrees. As such, when the vibrator 210 is carried with the frame 254 in a vertical orientation in the backpack configuration illustrated in FIG. 7, the flexible shaft 226 of the concrete vibrator 210 can be directed towards the ground without being bent into a "U" shape.

With reference to FIG. 8, the concrete vibrator 210 may also be carried with the frame 254 in a horizontal orientation in the briefcase configuration, with the back plate 346 and straps 234 (shown in broken lines) removed. In this manner, a user or multiple users of the concrete vibrator 210 may carry the frame 254 while directing the vibrator head 230.

The frame 254 is shaped such that a user or multiple users can hold the frame 254 at opposite sides of the frame 254 adjacent to the housing 214 and the motor 218, respectively. The frame 254 includes a base portion 255 to which the main housing 214 is coupled. The frame 254 further includes a first handle portion 256A extending from one end of the base portion 255 and configured to be grasped by a user while transporting the concrete vibrator 210 in the briefcase configuration. The frame 254 further includes a second handle portion 256B extending from an end of the base portion 255 opposite the first handle portion 256B. The second handle portion 256B is alternately graspable by a user while transporting the concrete vibrator 210 in the briefcase configuration. The back plate 346 is fastened to the base portion 255 of the frame 254. With reference to FIG. 8, a portion of the back plate 346 proximate the handle portion 256A includes a convex contour 257 on a surface 258 thereof facing away from the base portion 255.

Alternatively, as illustrated in FIG. 8, the frame 254 can rest upon the ground G with an end of the flexible shaft 226 extending along the motor axis 354 away from the ground G. The flexible shaft 226 can then be bent in the "U" shape towards the ground G. In this orientation, the user or multiple users do not need to hold the concrete vibrator 210. While utilizing the strap 234 for carrying the concrete vibrator in a backpack configuration, the user's hands are freed to operate the vibrator head 230 and/or the remote control unit 302. As such, a single user can fully operate the concrete vibrator 210.

With reference to FIGS. 7 and 8, the concrete vibrator 210 includes an actuator 358 operable to releasably attach the flexible shaft 226 to the motor 218. The actuator 358 is movable between a disengaged position in which the flexible shaft 226 is separated from the motor 218 and an engaged position in which the flexible shaft is secured to and receives torque from the motor 218. The actuator 358 is operable to be adjusted between the disengaged position and the engaged position without disassembly of the motor 218.

With continued reference to FIGS. 7 and 8, a pivot joint 361 pivotably couples the motor housing 219 and the main housing 214. The pivot joint 361 defines a passageway 362 (FIG. 7) extending between the housing 214 and the motor housing 219. The passageway 362 extends generally along the connection axis 350. The passageway 362 provides a location for routing electrical wires, which transmit power and electrical signals, between the controller 103 within the main housing 214 and the motor 218 within the motor housing 219.

In the embodiment illustrated in FIG. 7, the battery pack 222 is coupled to a battery receptacle 215 defined on the main housing 214. The battery pack 222 is attachable to the battery receptacle 215 along a battery insertion axis 366, which is oriented perpendicular to the connection axis 350. The battery insertion axis 366 extends into and out of the page from the frame of reference of FIG. 8.

Finally, the housing 214 of the concrete vibrator 210 has a storage receptacle 370 in which the remote control unit 302 can be stored when not in use (FIG. 8). In the illustrated embodiment, the remote control unit 302 is removably attached to the exterior of the housing 214 for storage. More specifically, the storage receptacle 370 is located on a lower surface 374 of the housing 214 closest to the ground G when in the backpack configuration. Other such attachment locations are possible. The illustrated storage receptacle 370 is also proximate the battery receptacle 215, and may include access to power from the battery pack 222 for charging the remote control unit 302 when it is attached to the housing 214.

In an alternative embodiment, the vibrating head 30 houses the motor 18 within the head 30. This alternative embodiment may be applied to either the concrete vibrator 10 or the concrete vibrator 210. In this embodiment, a power cord runs from the housing 14 through or along the shaft 26 (which, in this alternative embodiment, is merely configured as an outer jacket for protecting the power cord) to the motor 18. In the previously discussed embodiments, the flexible shaft 26 transmits torque from the motor 18 to the head 30. However, in this alternative embodiment, the motor 18 is located in the head 30, and the shaft 26 provides protection for the power cord connecting the housing 14 and the motor 18.

In another alternative embodiment, the motor 18 is located in the middle region of the shaft 26. In other words, the motor 18 may be located in-line with the shaft 26, with the motor 18 receiving electrical power at one end and transmitting torque at the other end. This alternative embodiment may be applied to either the concrete vibrator 10 or the concrete vibrator 210. The motor 18 may receive power from a power cord extending from the housing 14 to the middle region of the shaft 26 (which, in this alternative embodiment, is partially configured as an outer jacket for protecting the power cord). Then, a flexible shaft may extend within the shaft 26 between the motor 18 and the head 30 to rotate the eccentric shaft 70. Such a configuration may be beneficial during use of the concrete vibrator 10 in the briefcase configuration as the in-line configuration provides a lighter and more flexible section between the middle region of the shaft 26 and the housing 14. This lighter and more flexible section may induce less fatigue to a user during use. The lighter and more flexible section of the shaft 26 may be more maneuverable when compared to the previously discussed embodiments having a torque transmitting shaft extending the entire length of the shaft 26.

Various features of the invention are set forth in the following claims.

What is claimed is:

1. A concrete vibrator comprising:

a housing including a first end, an opposite second end, and a first surface extending between the first end and the second end;

a handle extending from the housing from the first surface of the housing;

an electric motor coupled to the housing;

a flexible shaft having a first end coupled to the motor and extending from the first end of the housing, and an opposite, second end;

a vibrator head coupled to the second end of the shaft, the vibrator head configured to receive torque from the motor and the shaft to cause the vibrator head to vibrate; and a battery pack coupled to a battery receptacle defined on the housing, the battery receptacle being defined on a second surface adjacent the first surface, the second surface extending between the first end and the second end, the battery pack configured to provide electric power to the electric motor to drive the motor and the shaft;

wherein the concrete vibrator is operable in a briefcase configuration in which the handle is used to carry the concrete vibrator with the housing supported in a horizontal orientation.

2. The concrete vibrator of claim 1, wherein the housing defines a longitudinal axis along a front-rear direction of the concrete vibrator, and wherein the handle is oriented parallel to the longitudinal axis.

3. The concrete vibrator of claim 1, further comprising a remote control unit capable of adjusting the operation of the electric motor to adjust a vibration frequency of the vibrator head.

4. The concrete vibrator of claim 3, wherein the housing includes a storage receptacle in which the remote control unit may be stored when not in use.

5. The concrete vibrator of claim 4, wherein the storage receptacle includes access to power from the battery pack for charging the remote control unit when the remote control unit is attached to the housing.

6. The concrete vibrator of claim 1, wherein the electric motor has a power output of at least about 2760 W and a nominal outer diameter of up to about 80 mm.

7. The concrete vibrator of claim 1, wherein the battery pack has a nominal voltage of up to about 80 V.

8. The concrete vibrator of claim 1, further comprising a hook extending from the housing, the hook being configured to support the weight of the concrete vibrator.

9. The concrete vibrator of claim 8, wherein the hook is removable from the housing.

10. A concrete vibrator comprising:

a housing including a first end, an opposite second end, and a first surface extending between the first end and the second end;

a handle extending from the housing from the first surface;

an electric motor coupled to the housing;

a flexible shaft having a first end coupled to the motor and extending from the first end of the housing, and an opposite, second end;

a vibrator head coupled to the second end of the shaft, the vibrator head configured to receive torque from the motor and the shaft to cause the vibrator head to vibrate;

a battery pack coupled to a battery receptacle defined on the housing, the battery receptacle being defined on a second surface adjacent the first surface, the second surface extending between the first end and the second end, the battery pack configured to provide electric power to the electric motor to drive the motor and the shaft; and a remote control unit capable of adjusting the operation of the motor to adjust a vibration frequency of the vibrator head while the concrete vibrator is operated in a briefcase configuration in which the handle is used to carry the concrete vibrator with the housing supported in a horizontal orientation.

11. The concrete vibrator of claim 10, further comprising a controller in electrical communication with the motor, wherein the remote control unit is operable to communicate with the controller via a communications link to adjust the vibration frequency of the vibrator head.

12. The concrete vibrator of claim 11, wherein the remote control unit is operable to receive a signal from the controller indicating a running state of the motor.

13. The concrete vibrator of claim 12, wherein the remote control unit includes an indicator for communicating to a user of the concrete vibrator the running state of the motor.

14. The concrete vibrator of claim 13, wherein the remote control unit is configured to receive user input and transmit the user input to the controller, and wherein the controller is configured to receive the user input and adjust the operation of the motor based on the user input.

15. The concrete vibrator of claim 11, wherein the remote control unit is wirelessly connected to the controller.

16. The concrete vibrator of claim 11, further comprising a work light in electrical communication with the controller, wherein the work light is configured to be selectively activated with the remote control unit to illuminate an area of wet concrete in which the vibrator head is immersed.

17. The concrete vibrator of claim 10, wherein the electric motor has a power output of at least about 2760 W and a nominal outer diameter of up to about 80 mm.

18. The concrete vibrator of claim 10, wherein the battery pack has a nominal voltage of up to about 80 V.

19. The concrete vibrator of claim 10, wherein the housing includes a storage receptacle in which the remote control unit may be stored when not in use.

20. A concrete vibrator comprising:

a housing including a first end, an opposite second end, and a first surface extending between the first end and the second end;

a handle extending from the housing from the first surface;

an electric motor coupled to the housing;

a flexible shaft having a first end coupled to the motor and extending from the first end of the housing, and an opposite, second end;

a vibrator head coupled to the second end of the shaft, the vibrator head configured to receive torque from the motor and the shaft to cause the vibrator head to vibrate;

a battery pack coupled to a battery receptacle defined on the housing, the battery receptacle being defined on a second surface adjacent the first surface, the second surface extending between the first end and the second end, the battery pack configured to provide electric power to the electric motor to drive the motor and the shaft;

wherein the concrete vibrator is operable in a briefcase configuration in which the handle portion is used to carry the concrete vibrator in a horizontal orientation; and wherein the electric motor has a power output of at least about 2760 W and a nominal outer diameter of up to about 80 mm, and wherein the battery pack has a nominal voltage of up to about 80 V.

* * * * *